J. L. MOHUN.
AUTOMATIC PIPE CONNECTOR.
APPLICATION FILED JUNE 23, 1908.

924,486.

Patented June 8, 1909.
10 SHEETS—SHEET 3.

Fig. 3.

Witnesses:

Inventor
John L. Mohun
By his Attorneys

J. L. MOHUN.
AUTOMATIC PIPE CONNECTOR.
APPLICATION FILED JUNE 23, 1908.

924,486.

Patented June 8, 1909.
10 SHEETS—SHEET 4.

J. L. MOHUN.
AUTOMATIC PIPE CONNECTOR.
APPLICATION FILED JUNE 23, 1908.

924,486.

Patented June 8, 1909.
10 SHEETS—SHEET 5.

Witnesses:

Inventor
John L. Mohun
By his Attorneys

J. L. MOHUN.
AUTOMATIC PIPE CONNECTOR.
APPLICATION FILED JUNE 23, 1908.

924,486.

Patented June 8, 1909.
10 SHEETS—SHEET 6.

Witnesses:

Inventor
John L. Mohun
By his Attorney

J. L. MOHUN.
AUTOMATIC PIPE CONNECTOR.
APPLICATION FILED JUNE 23, 1908.

924,486.

Patented June 8, 1909.
10 SHEETS—SHEET 7.

Witnesses:

Inventor
John L. Mohun
By his Attorneys

J. L. MOHUN.
AUTOMATIC PIPE CONNECTOR.
APPLICATION FILED JUNE 23, 1908.

924,486.

Patented June 8, 1909.
10 SHEETS—SHEET 8.

J. L. MOHUN.
AUTOMATIC PIPE CONNECTOR.
APPLICATION FILED JUNE 23, 1908.

924,486.

Patented June 8, 1909.
10 SHEETS—SHEET 9.

UNITED STATES PATENT OFFICE.

JOHN L. MOHUN, OF NEW YORK, N. Y.

AUTOMATIC PIPE-CONNECTOR.

No. 924,486.

Specification of Letters Patent.

Patented June 8, 1909.

Application filed June 23, 1908. Serial No. 439,909.

*To all whom it may concern:*

Be it known that I, JOHN L. MOHUN, a citizen of the United States, and a resident of the borough of Brooklyn, of the city of New York, in the State of New York, have invented certain new and useful Improvements in Automatic Pipe-Connectors, of which the following is a specification, reference being had to the accompanying drawings, forming a part hereof.

One of the objects of the present invention is to provide an automatic pipe connector which shall be particularly adapted for use upon freight cars, where there is no steam or signal line, but simply a train line for controlling the brakes, and where accordingly only one conduit or passage has to be provided for the conduction of a pressure fluid.

Another object of the present invention is to provide several improved features some of which may be used in automatic pipe connectors of various types and constructions and others of which have been devised particularly for use in connection with a pipe connector of the type or style shown in the drawings. These different features will be referred to hereinafter in connection with the detailed description.

Figure 22:
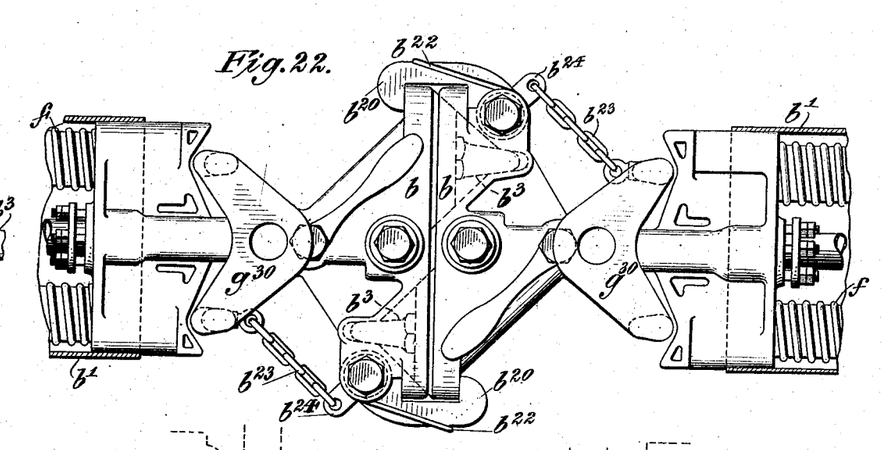
Figs. 22 and 23 are respectively a view in plan and a view in side elevation, illustrating a positive means for automatically locking together the heads of two adjacent connectors, and, Fig. 24 is a detail view in plan of one of the connector heads unlocked.
Figure 23:
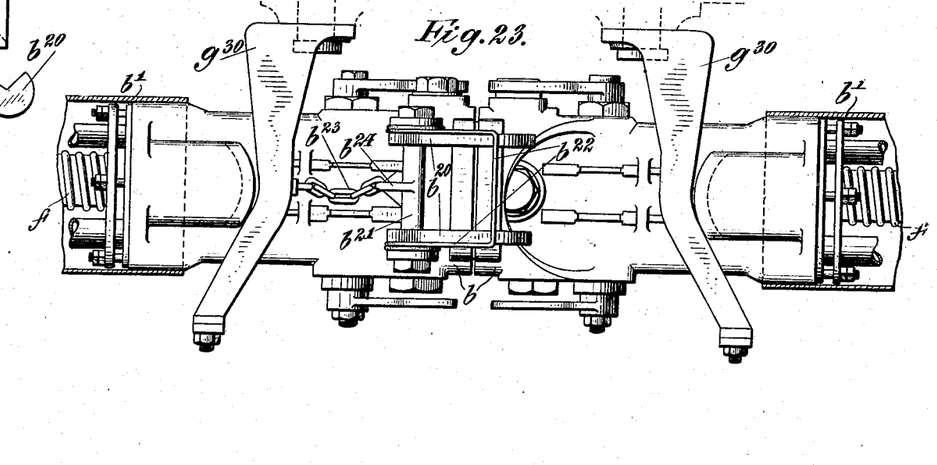
Figure 24:
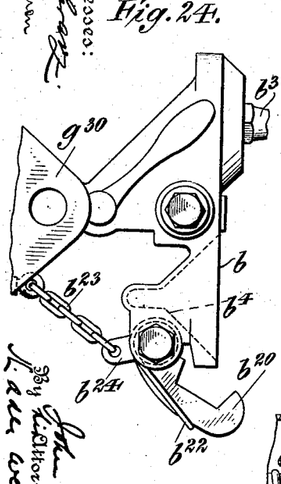

In the drawings, all of the figures, save Figures 22, 23 and 24, illustrate an automatic pipe connector or parts thereof having a single conduit or passage for the train line, such as is particularly adapted for use upon the cars of freight trains, while Figs. 22, 23 and 24 illustrate parts of an automatic pipe connector having more than one passage or conduit, such as would be used upon passenger trains; but it will be obvious, as the description proceeds, that most of the features of the invention are independent of and have no concern with the number of conduits or passages in the connector or in other words with the number of different lines involved.

In said drawings.

Referring first to Figs. 1 to 4 inclusive, which illustrate a connector designed particularly to be applied to the cars of freight trains or trains having no steam or signal lines, the base $a$ is secured rigidly to the underside of the car body (indicated by broken lines) and forms or has fastened thereto one member of a ball-joint. The other member of this joint is integral with or secured to a member $c$ which is intermediate the base $a$ and the head $b$ of the connector and upon which the head is slidable or extendible. In the present case, this joint comprises a ball member $d^{20}$ cored to form a passage for the train line, and a socket member $d^{21}$ fitting tightly upon the ball member and binding it securely to the base so that its flaring passage $d^{22}$ communicates properly with a somewhat larger passage $d^{23}$ formed in the base. This passage $d^{23}$ is continued up through the base where it communicates with the train pipe underneath the car. In assembling the parts just referred to (Fig. 3), the socket member $d^{21}$ is first slipped over the ball member $d^{22}$ and then a large casting $c'$, which constitutes part of the intermediate member $c$, may be screwed on to the end of the ball member and the socket member secured to the base $a$.

Figure 3:
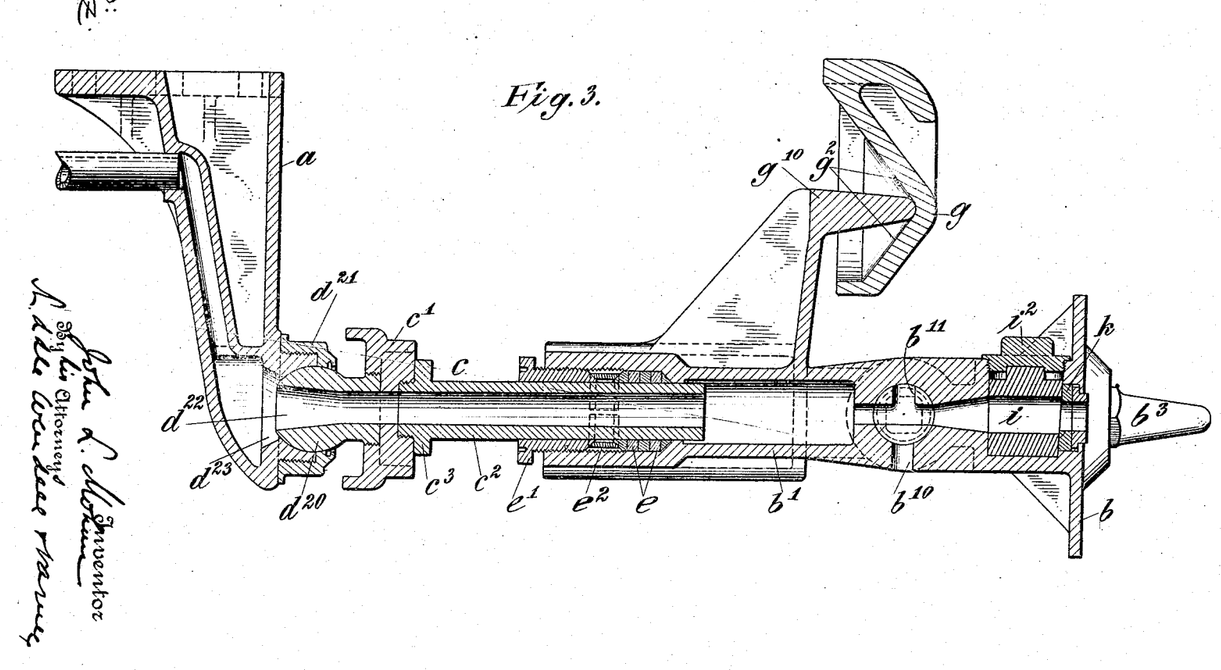
Fig. 3 is a sectional view, the plane of section being indicated by the line 3—3 in Fig. 2.
Figure 4:
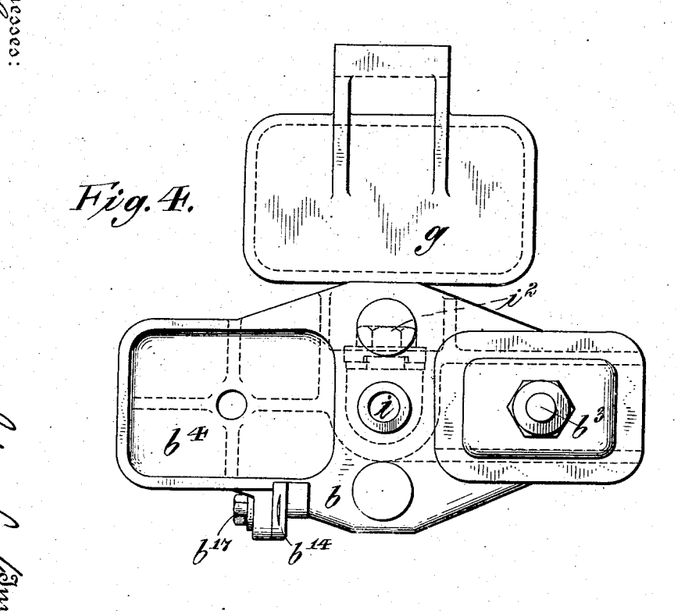
Fig. 4 is a view in front elevation.

Screwed into the casting $c'$ is a pipe $c^2$ preferably formed with a shoulder $c^3$ shaped like a nut and integral therewith for more conveniently fastening the pipe in place. The latter extends into a passage formed in the rear portion $b'$ of the slidable connector head and thus constitutes a plunger or piston, suitable packing being provided to give it a tight working fit in said passage. Such packing may comprise asbestos graphite rings $e$, a gland $e'$ and a resilient split ring $e^2$ the ends of which tend to draw together and which ring acts as a spring to take up automatically the wear upon the packing rings.

In order to keep the faces of two connectors together when coupled, a suitable pressure is applied to the connector head and acts at all times to force the head forward. For this purpose, two springs $f$ may be provided, one on each side of the pipe $c^2$, pockets or seats for these springs being formed in the casting $c'$, and in the rear end $b'$ of the connector head. It should be noted that the springs, pressing as they do against the casting $c'$, will keep the ball member $d^{20}$ at all times hard against the socket member $d^{21}$, thus always insuring a tight joint and taking up any wear.

Figure 1:
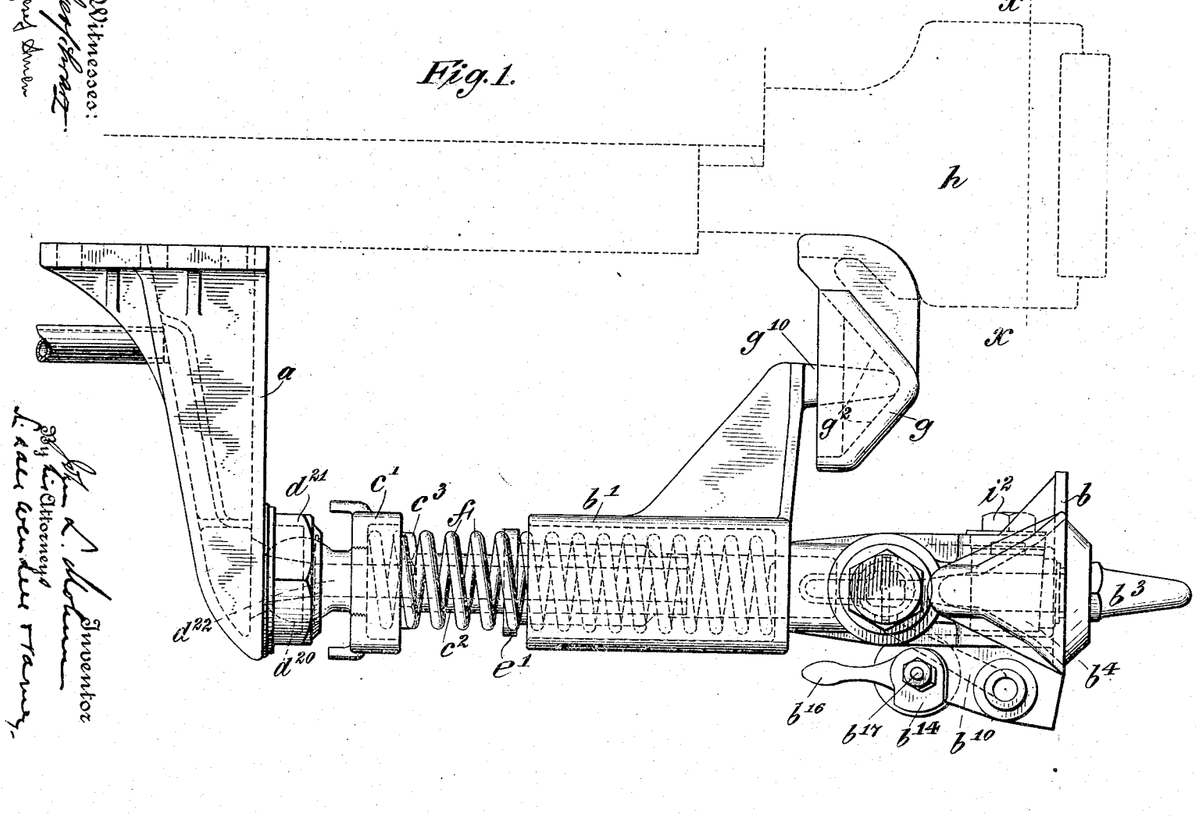
Fig. 1 is a view in side elevation of a single passage pipe connector, a part of the car and the coupler thereon to which the connector is attached, being shown in dotted outline.
Figure 2:
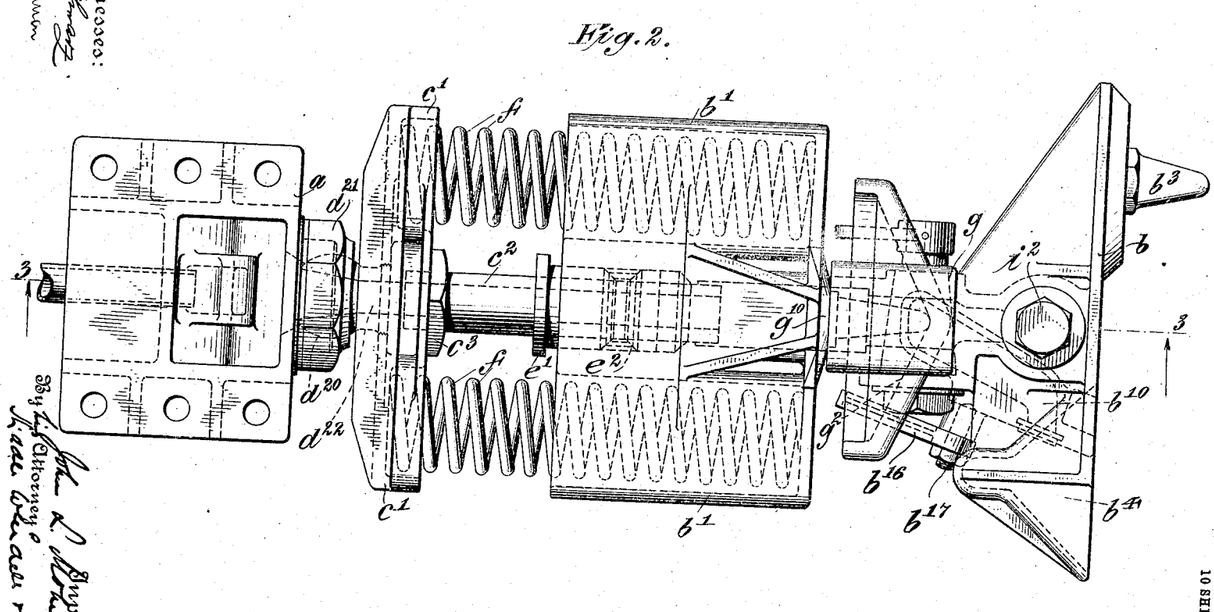
Fig. 2 is a plan view of the connector.

The forward movement of the head is limited by what may be referred to as a supporting or centering member $g$ which is preferably fastened to the under side of the car coupler indicated in outline by broken lines in Fig. 1 and designated by the letter $h$. This member is shown in the present case as a funnel $g$ with which a pin or projection $g^{10}$ rigidly secured to the head of the connector, coöperates. When coupling takes place, it will be understood that the head is moved backward and held by the head of the adjacent coupler, so that it is entirely free of the centering member $g$. When the head is uncoupled again, it moves forward and the inclined surface $g^2$ of the funnel-shaped member, causes the pin or projection $g^{10}$ which is forced ahead by the action of the springs $f$, to be brought into the center of the funnel-shaped member. The funnel-shaped member and pin are so proportioned and arranged with respect to the head of the connector that this action of the pin and funnel will bring the head into a pre-determined position, that is into the proper vertical and lateral position for engaging another coupler head when the next coupling takes place. It will be obvious that the pin and funnel may be arranged on either side of the head or underneath the head of the connector, instead of at the top, as shown; but it is preferable to secure the funnel to the car coupler above the connector as illustrated. When so arranged it will be understood that the face $b$ of the connector head is arranged so that, in its forward or uncoupled position, it is somewhat in advance of the pulling face of the knuckle of the car coupler (indicated at $x$—$x$ in Fig. 1) so as to insure the proper amount of compression between the faces of two connectors when coupled. The face is provided with male and female members $b^3$ and $b^4$ for "gathering" the two heads together in effecting a coupling and causing the port or ports in the face of the connector to register, all as will be readily understood.

As illustrated particularly in Fig. 3, it will be seen that the port there shown in the face of the connector is provided with a gasket which is forced home by a wedge $i$, a packing ring or washer $k$ being interposed between the wedge $i$ and the gasket. For the purpose of removing and replacing a gasket without uncoupling two adjacent connectors, an opening is formed in one of the lateral faces of the head, as in the present case at the top, through which the wedge $i$, washer $k$ and gasket may be removed. Covering this opening is a nut $i^2$ by means of which the wedge $i$ is drawn up and held in place.

Sometimes a car provided with an automatic connector may have to be coupled to one having the ordinary air brake hose and couplings, and to take care of such a contingency, the connector is provided with an auxiliary passage $b^{10}$ (Figs. 2, 3 and 5) tapped into the main passage which extends to the front face $b$ of the connector. The main passage referred to is the regular passage extending from the base to the face of the connector and there may be of course as many main passages as there are different lines embodied in the connector. In the present case where only one line, the train line, is illustrated, the auxiliary passage corresponding thereto extends from such line to a point in one of the lateral faces of the connector head (Fig. 1), a slight extension of the head being provided for this purpose if necessary. At the junction of the main passage and auxiliary passage, it is preferable to provide a three-way valve $b^{11}$ in order that by giving the same a quarter turn the main line passage may be made to communicate with the port in the face of the connector or with the port in the side of the connector through the auxiliary passage.

Figure 5:
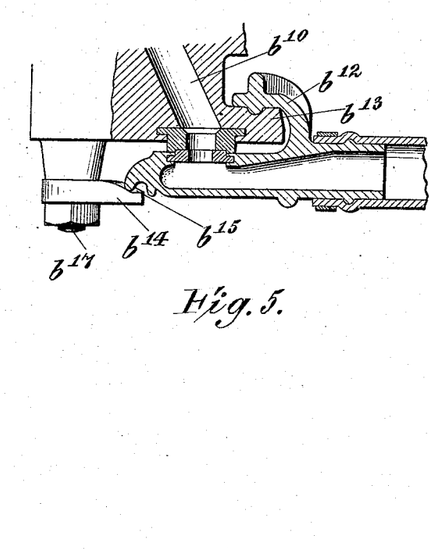
Fig. 5 is a detailed sectional view showing the manner of attaching a flexible hose to the head of the connector.

In Fig. 5, a conventional form of hose coupling is illustrated as it would appear when secured upon the connector head with its port registering with the port in the side of the connector head. This hose has a short projection $b^{12}$ embracing a flange $b^{13}$ upon the connector head, and the connector head is provided with a fastening member $b^{14}$ which has an inclined face $b^{15}$ and a handle $b^{16}$. By means of the handle the fastening member may be swung on its pivot $b^{17}$ to press the end of the hose against the side of the connector head and thus securely hold the same thereon. In its coupled position, the handle extends downwardly so that the fastening member $b^{14}$ is held in such position by the weight of the handle. Where three lines are embodied in the connector there may of course be three auxiliary passages extending to the lateral faces of the connector and means may be provided for securing three separate hose pipes thereto.

Figure 6:
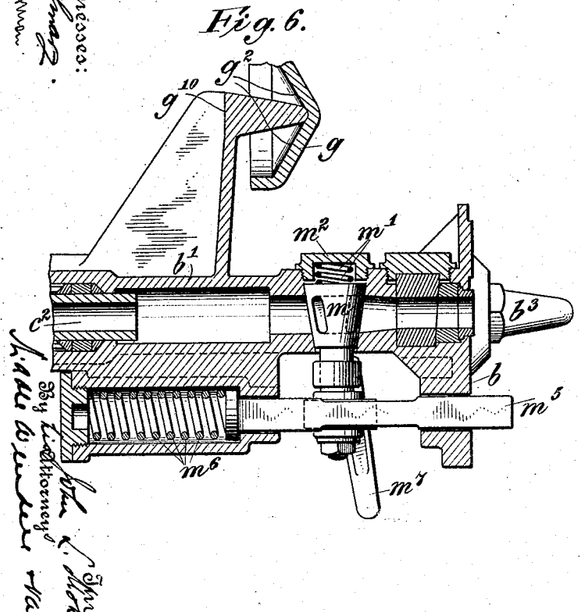
Fig. 6 is a detail sectional view and Fig. 7 is a detail view partly in section and partly in plan of the head of the connector illustrating a means for automatically operating the plug cock in the train line, which means are not shown in Figs. 1 to 5.
Figure 7:
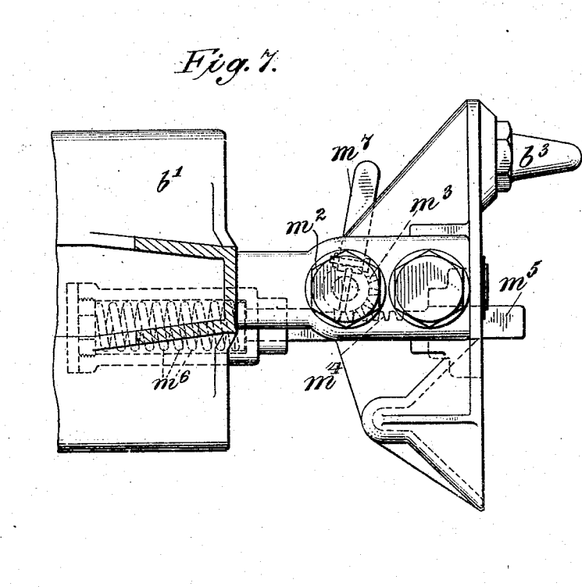

Referring now to Figs. 6 and 7, these figures illustrate one form of automatic device which may be applied to operate the valve controlling the passage through the connector, or a plurality of valves, if there be more than one passage in the connector. The provision of such an automatic device obviously is important as it adds another factor of safety, insuring as it does that the valve or valves will always be found in their proper positions and making it unnecessary for trainmen to go down between the cars to operate them. In Figs. 6 and 7, only one passage is shown, but this will sufficiently illustrate the improvement. The valve controlling the passage is embodied in a cock $m$ held tightly upon its seat by a spring $m'$ interposed between the cock and a cap nut $m^2$. The cock is extended at its smaller end, that is the end farthest from the cap nut $m^2$, and is provided with a pinion in the form of a gear segment $m^3$ which meshes with a rack $m^4$ formed upon a slidable member or rod $m^5$ the end of which projects in such a way as to be pushed back when coupling takes place as by the adjacent part of another connector head. In the case of Figs. 6 and 7 this rod or slidable member will be seen to project through the face $b$ of the connector head and to be urged forward by a spring $m^6$ housed in the connector head directly back of said rod or slidable member. It will thus be seen that upon coupling, this rod or slidable member will be pushed back by the adjacent connector face and thus through the rack and pinion will operate to turn the cock and thus control the position of the valve. It will be obvious that where such an automatic device is employed in the steam line, it will generally be desirable to have the automatic device and cock so related that the valve will operate automatically to open this line when a coupling has taken place and to close the line when an uncoupling is effected; and with the signal line an arrangement will generally be adopted to keep the line open upon uncoupling. Where, however, an automatic device such as has just been described, is employed to operate the plug cock in the train line, conditions of use or operation make it desirable to adopt such connections between the automatic device and cock as shall permit at least four different relative positions of the cock with respect to the automatic device. In other words, it is desirable to have such an arrangement as will permit the cock to be either open or closed when the connector is uncoupled and also opened or closed when the connector is coupled. Ordinarily, of course, the cock should be open when the connector is coupled in order to preserve the continuity of the train pipe passage, and when the connector is suddenly uncoupled as upon the parting of a train, it should remain open so as to cause the brakes to be applied instantly. But in some cases such as when the cars are about to be shunted from the train or where the brakes upon a particular car are out of order, it is desirable that the cock be closed while the connector is in its coupled position. Then again, where the connector comes at the end of a train, it is desirable that the cock in the train line should be closed while the connector is in its uncoupled position. The practical reasons therefore for the four positions referred to will be readily understood. To permit all of these positions, hand means are provided for operating the cock in addition to the automatic means so that the cock may be either open or closed in the coupled or uncoupled position of the connector independently of the automatic means. For this purpose, (Fig. 12), a handle $m^7$ is employed having a projection $m^8$ pivoted thereto which extends through the cock body and serves as a key between the gear segments $m^3$ and the cock. The handle is preferably mounted so that its weight will hold it in a position to keep the projection $m^8$ in engagement with the gear segment, but is pivoted so that upon raising it, the projection will be withdrawn a sufficient extent to release entirely the gear segment from the cock and permit the latter to be turned independently of the former. Lost motion is provided between the gear segment and cock so that the rack $m^4$ may move without turning the cock as when, for instance, the rod $m^5$ moves forward during uncoupling. This lost motion may be produced by cutting a relatively long groove $m^9$ in the gear segment for the projecting end of the key $m^8$ to engage in, the other side of the pinion forming the gear segment being slotted as at $m^{10}$ to permit the key and pinion to have a certain amount of free movement in respect to each other.

Figure 8:
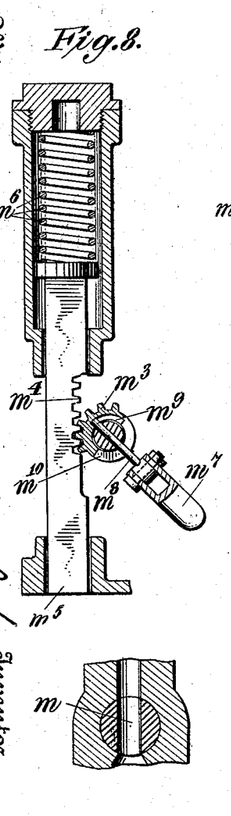
Figs. 8 to 11 inclusive are views partly in section, partly in elevation and partly diagrammatic, illustrating different relative positions of the cock with respect to the automatic means for operating the same and with respect to the valve controlled thereby, these positions being developed with reference particularly to passenger or short freight trains.
Figures 9, 10:
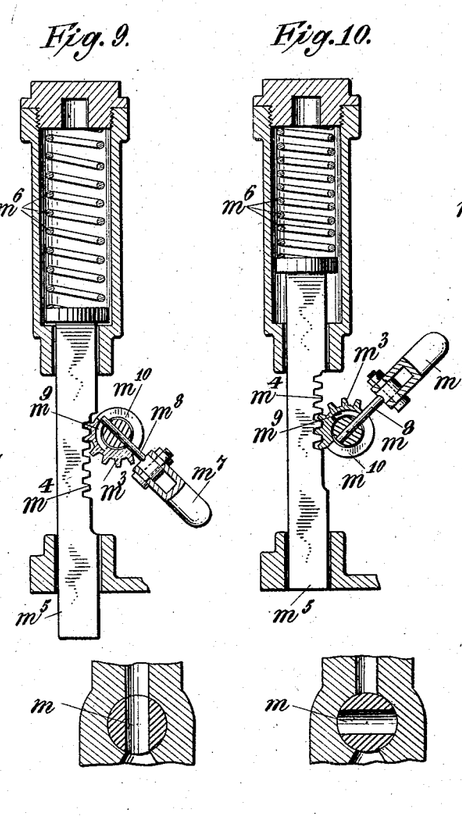
Figures 11, 12:
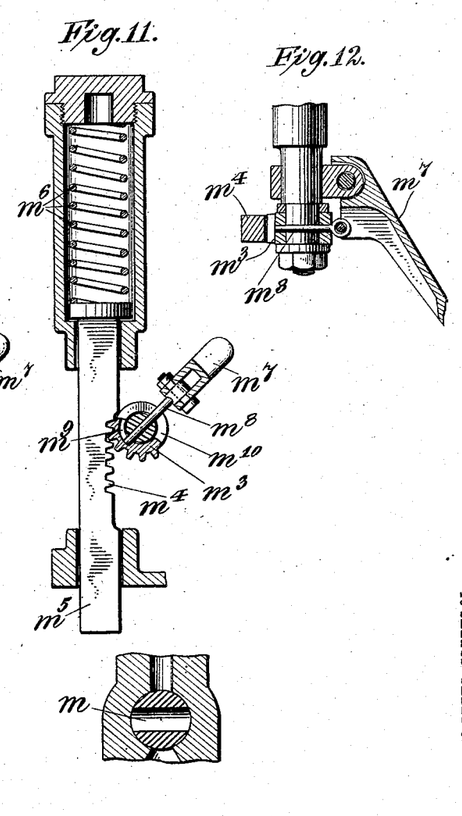
Fig. 12 is a detail sectional view showing a portion of a handle for manually operating the cock and its relation to the adjacent parts.

In Figs. 8 to 11 inclusive, the four positions of the cock are illustrated *seriatim* and in connection with the respective positions of the valve controlled by the cock which are shown diagrammatically underneath the corresponding illustration of the cock. In Fig. 8, the connector is shown as coupled and the valve is open; in Fig. 9 the connector is uncoupled and the valve is open, this position occurring, for instance, when the connectors are parted upon the breaking of a train, their previous positions having been as illustrated in Fig. 8. Fig. 10 shows how the handle may be operated when the connectors are coupled (as in Fig. 8) to close the cock, as for shunting cars or when the brakes on a particular car are out of order; and Fig. 11 shows how the handle may be manipulated to close the cock when the connector is uncoupled as would be the case at the end of a train for instance. In the position shown in Fig. 10, the key has been withdrawn from engagement with the gear segment, but will snap back again automatically as is obvious, when the connector is uncoupled as shown in Fig. 11. It should be particularly noted that when the connector is coupled from either of the positions shown in Figs. 9 and 11, the cock will be found in its open position when the coupling has been effected.

Figure 13:
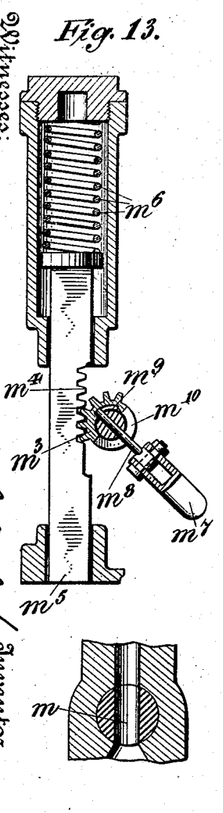
Figs. 13 to 17 inclusive are views similar to those of Figs. 8 to 11 inclusive, but illustrating positions which have been developed with respect particularly to long freight trains.
Figure 14:
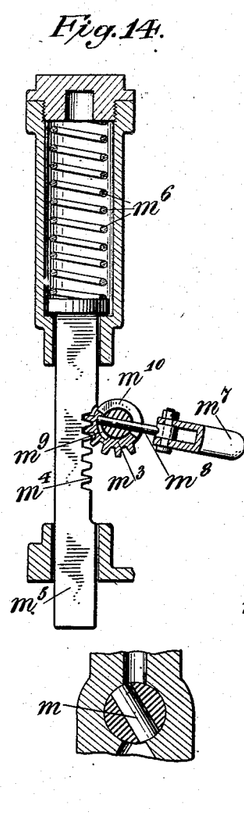
Figure 15:
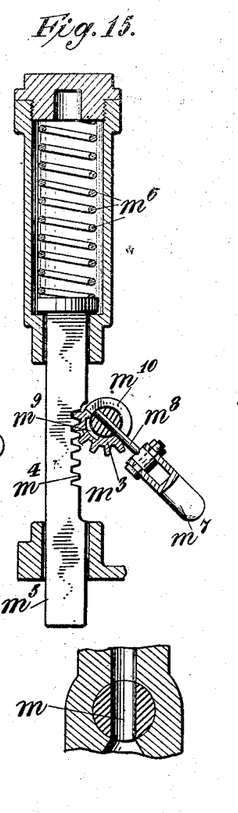
Figure 16:
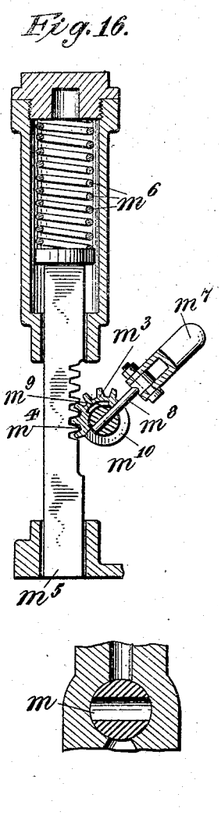
Figure 17:
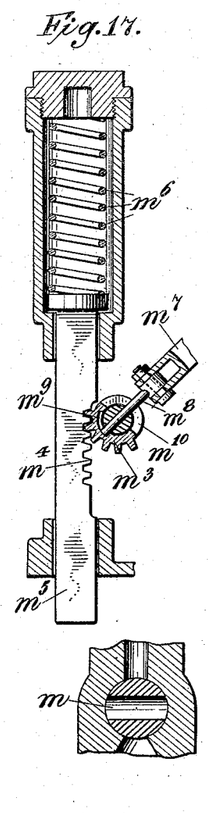

The positions of the cock just discussed have been considered with reference to the particular conditions which exist upon passenger trains, or upon trains comparatively short and of light equipment. With long and heavy freight trains, however, another factor is introduced which ordinarily would have to be dealt with in practice. This factor has reference to the danger caused by applying the brakes of freight trains in what is known as the "emergency". This is what happens for instance in a passenger train, when there is a parting of the train at any point, the breaking of the train line leaving that line wide open and causing a very sudden drop in pressure in the train line thus applying the brakes suddenly with the maximum pressure. Now while such a condition is desirable for passenger and short freight trains, it causes, as is well known, the buckling of the train at one or more points, where the train is long and made up of relatively light and heavy cars. Now, if Figs. 8 and 9 be compared again, it will be seen how upon the parting of the connectors when they are coupled with the cock open as in Fig. 8, they will go to the uncoupled position with the cock open as in Fig. 9 thus applying the brakes in the "emergency". By comparing these two figures with Figs. 13 and 14, the modification of the connections will be understood to adapt them for applying the brakes automatically in the "service" position such as would be most satisfactory for heavy mixed freight trains. Of these two figures, Fig. 13 corresponds with Fig. 8 and illustrates the position of the parts with the valve open when coupled, and Fig. 14 illustrates the position of the parts when uncoupling takes place from the position shown in Fig. 13. For the sake of clearness, Figs. 15, 16 and 17 have been added to correspond respectively with Figs. 9, 10 and 11 and show completely how the automatic valve controlling device may be applied best to freight trains. Referring to Fig. 14 again, and comparing this figure with Fig. 9, it will be seen that the pinion or gear segment $m^3$ is provided with a groove $m^9$ for the key $m^8$ on the handle $m^7$, which groove is slightly shorter than the corresponding groove $m^9$ in Fig. 9 with the result that, as the connector is uncoupled from the position shown in Fig. 13, the end wall of the groove $m^9$ will engage the key and turn the cock slightly so that the valve will be moved to the service position (see diagram of the valve underneath Fig. 14). This, as will be understood, will cause the brakes to be applied gradually. The shortening of the groove in the gear segment makes it necessary to withdraw the key in order to open the valve to its full extent when the connector is uncoupled, and this position is illustrated in Fig. 15. The shortening of the groove makes no difference so far as the positions illustrated in Figs. 16 and 17 are concerned, as will be seen by comparing these figures with Figs. 10 and 11.

Figure 18:
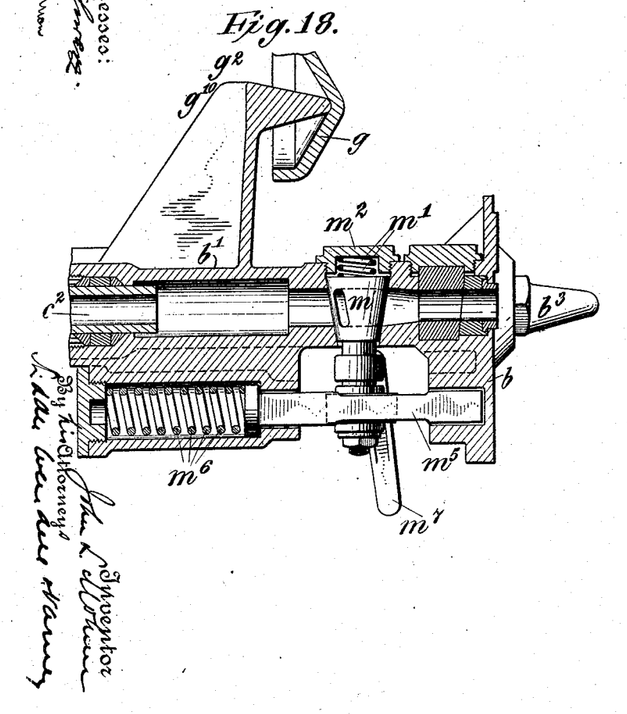
Figs. 18 and 19 are views similar respectively to Figs. 6 and 7, but showing a modification of the automatic means for operating the valve in the train line.
Figure 19:
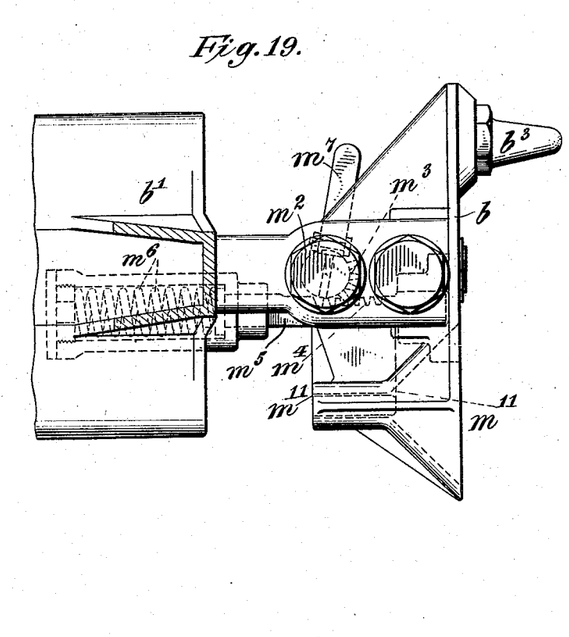

In Figs. 18 and 19 a modification of the automatic device for operating the valve or valves controlling the passages in the connector is shown. These figures differ very slightly from Figs. 6 and 7. In the latter two figures the rod or slidable member $m^5$ is seen to project through the face $b$ of the connector head and in some instances it may be undesirable to have such a projecting member in the connector face in which instances the modified construction shown in Figs. 18 and 19 may be preferable. In such modified construction the rod or slidable member $m^5$ with its complementary spring $m^6$ is provided and has a rack $m^4$ engaging the gear segment $m^3$ as before. Instead of projecting through the coupler face however, this rod has secured thereto another rod or slidable member $m^{11}$ the end of which normally projects into the funnel or female gathering member $b^4$; thus, when the pin $b^3$ is inserted into the funnel $b^4$ during coupling, it will engage and push back the rod $m^{11}$ and thus operate to turn the cock.

Figure 20:
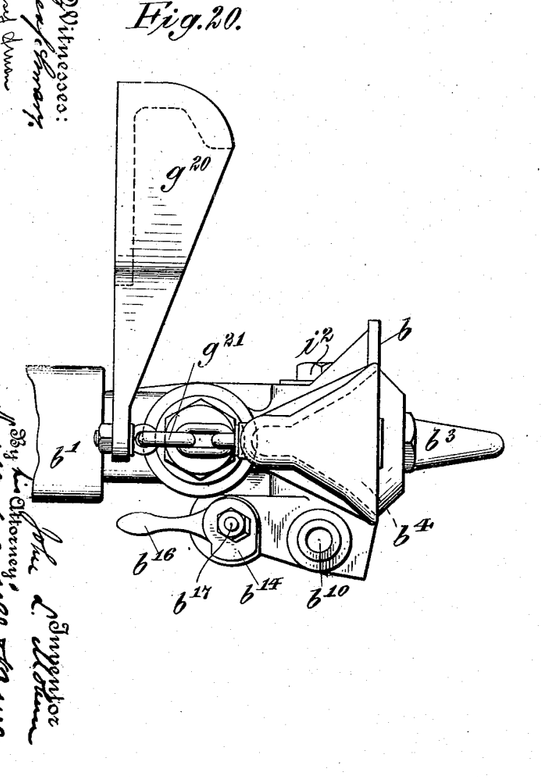
Figs. 20 and 21 are respectively a view in side elevation and a view in front elevation illustrating a different means for bringing the head of the connector into a predetermined position for coupling.
Figure 21:
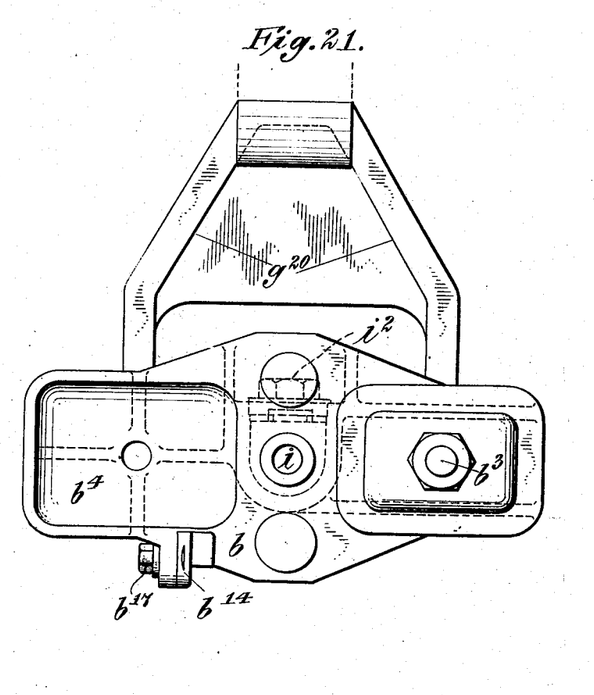

Figs. 20 and 21 illustrate a modification of the means for bringing the head of the connector into a predetermined position for coupling. In Fig. 1, for instance, it will be seen that a pin and funnel were employed for this purpose, the pin traveling upon the inclined surface of the funnel to bring the head into center. In Figs. 20 and 21 a centering member $g^{20}$ is employed and may be made fast, like the funnel of Fig. 1, to the coupler or may be secured to any other suitable part. This centering member is preferably in the form of a yoke and to each arm of this yoke a connecting member, preferably a chain $q^{21}$, is connected with the side of the connector head in advance of the yoke. When the coupling has been effected, the chain on either side, as will be obvious, will be slack, thus permitting the desired range of movement of the connector; but when the connector head is uncoupled, the springs $f$ will force the connector head to its advanced position as before, and the chain will be drawn taut and will cause the connector head to be brought into the proper position for coupling.

In Figs. 22 to 24 inclusive a means for automatically locking together two opposing connector heads is shown. These means comprise a couple of clamps $b^{20}$ (although one clamp might suffice) pivoted upon one side of the connector head by means of a bolt $b^{21}$ or some other suitable pivoting means. These clamps are provided with a spring $b^{22}$ which constantly urges them in toward the clamping or fastening position such as is illustrated in Fig. 22. A chain or the like $b^{23}$ is provided one end of which is connected to a lug $b^{24}$ upon the pivot bolt $b^{21}$ and the other end of which is connected to a fixed part such as the centering member $g^{30}$ which serves to bring the head of the connector in a predetermined position for coupling. With such a construction, the fastening clamps will be held back from the fastening position by the chain when the connector is uncoupled and the connector head is in its extended position (Fig. 24). When however the head of the connector is forced back in the act of coupling, the chain $b^{23}$ will be relaxed and will permit the spring $b^{22}$ to throw the clamps into the fastening position, and in that position they will be held by the springs until the uncoupling takes place. Upon uncoupling the two yokes (Fig. 22) will first move backwardly until they encounter the portions of the head castings directly behind at which point the connector faces will be drawn apart; the moving back of the heads however will have first drawn the chains $b^{23}$ taut and thus have unfastened the clamps before the connector heads have tended to separate. Fig. 22 illustrates how by providing one set of clamps on one side of the connector, two connectors will be clamped on both sides when brought together. When the heads are thus coupled together, it will be obvious that the slack of the chains should be sufficient to compensate for the movement of the connector head due to the wear of the knuckles of the car couplers.

I claim as my invention:

1. In a pipe connector having a single passage, the combination of a connector head through which the passage extends, a base, an intermediate member having a plunger extending into the head, and a ball-joint between the intermediate member and base and through which the passage extends.

2. In a pipe connector having a single passage, the combination of a connector head through which the passage extends, a base, an intermediate member having a plunger extending into the head, a spring to hold the head normally in its extended position, and a ball-joint between the intermediate member and base and through which the passage extends.

3. In a pipe connector having a single passage, the combination of a connector head through which the passage extends, a base, an intermediate member having a plunger extending into the head, coiled springs interposed between the head and member, the head and member having pockets in which the springs are seated, and a ball-joint between the intermediate member and base and through which the passage extends.

4. In a pipe connector having a single passage, the combination of a base, head and intermediate member, the head and intermediate member being adapted to twist the one upon the other, and a ball joint between the intermediate member and base.

5. In a pipe connector having a single passage, the combination of a ball-joint through which the passage extends, and yielding means to hold the parts of the joint at all times in close contact so that the passage through the joint shall be tight.

6. In a pipe connector having a single passage, the combination of a ball-joint through which the passage extends, a connector head, and means interposed between the head and joint to hold the parts at all times in close contact so that the passage through the joint shall be tight.

7. In a pipe connector having a single passage, the combination of a ball-joint through which the passage extends, a connector head, and a spring interposed between the head and joint.

8. In a pipe connector having a single passage, the combination of an extendible head, a base through which said passage is continued, a ball member constituting a part of a joint between the head and base and through which said passage extends, means to limit the extension of the head, and a spring between the head and the ball member adapted to press the ball member against the base and keep the passage through the joint tight.

9. In a pipe connector, a movable connector head having a main passage and an auxiliary passage tapped into the main passage, and a three-way valve at the junction of the main passage and the auxiliary passage.

10. In a pipe connector, a movable connector head having a main passage extending to the front face of the connector head, an auxiliary passage tapped into the main passage and extending to a lateral face of the connector head, and means to fasten a hose to the connector head at the end of the auxiliary passage comprising a fastening member with an inclined face and a handle secured thereto and adapted to maintain the fastening member in its fastening position by gravity.

11. In a pipe connector, the combination of a valve, a gathering pin, a funnel for the gathering pin of another connector, and a rod projecting into the funnel and operatively connected with the valve, whereby upon coupling, the gathering pin upon an adjacent connector will push back the rod and operate the valve.

12. In a pipe connector, the combination of a connector head having a passage therein, a valve to open and close the passage, a gathering pin, a funnel for the gathering pin of another connector, a slidable member, a spring to keep the slidable member projecting normally into the funnel, and connections between the slidable member and the valve, whereby upon coupling, the gathering pin upon an adjacent connector will push back the rod and operate the valve.

13. In a pipe connector, the combination of a valve for controlling the train line, means adapted to be moved by an opposite part in another connector, and connections between said means and valve whereby upon coupling, said valve will be in its open position and upon uncoupling, said valve will be left in its open position.

14. In a pipe connector, the combination of a valve for controlling the train line, means adapted to be moved by an opposite part in another connector, and connections between said means and valve whereby upon coupling, said valve will be in its wide-open position and upon uncoupling, said valve will be brought from its wide-open position to the service position.

15. In a pipe connector, the combination of a valve for controlling the train line, manually operative means for opening and closing said valve, automatic means adapted to be moved by an opposite part in an adjacent connector, and connections between said manually operative means, said automatic means and valve whereby after coupling, the valve will be in its open position without regard to its position before coupling, and upon uncoupling will still remain at least partly open until closed by the manually operative means.

16. In a pipe connector, the combination of a valve for the train line, means for automatically operating said valve, and means for manually operating said valve.

17. In a pipe connector, the combination of a cock for controlling a valve in the train line, a pinion on the cock, means engaging the pinion for automatically operating the cock, and a connection between the cock and pinion permitting lost motion between the cock and pinion.

18. In a pipe connector, the combination of a cock for controlling a valve in the train line, a pinion on the cock, means engaging the pinion for automatically operating the cock, and a key connecting the cock and pinion.

19. In a pipe connector, the combination of a cock for controlling a valve in the train line, a pinion on the cock, means engaging the pinion for automatically operating the cock, a handle for manually operating the cock, and a key pivoted to the handle and adapted to connect the cock and pinion.

20. In a pipe connector, the combination of a cock for controlling the valve in the train line, a pinion on the cock, means engaging the pinion for automatically operating the cock, a handle for manually operating the cock, and a key pivoted to the handle, the pinion having a long groove into which the end of the key is adapted to project, and the weight of the handle being adapted to hold the projecting end of the key in said groove.

21. In a pipe connector, the combination of an extendible connector head, a centering member, a spring for normally holding the head in its extended position, and a chain between the head and the centering member.

22. In a pipe connector, the combination of an extendible connector head, a centering yoke, a spring for normally holding the head in its extended position, and a chain on each side of the head and connecting the head with each side of the yoke.

23. In a pipe connector, the combination of clamps upon the head of the connector to fasten the same to the head of another connector, springs for forcing the clamps into fastening position and maintaining the clamps in such position, and automatic means for withdrawing the clamps from the fastening position and for holding them back from such position against the action of the springs.

24. In a pipe connector, the combination of an extendible connector head, clamps upon said head to fasten it to the head of another connector, springs for forcing the clamps into fastening position and maintaining the clamps in such position, and a connection between each clamp and a fixed part so that when the connector head is extended the clamps will be drawn back against the action of the springs and vice versa.

25. In a pipe connector, the combination of an extendible connector head, clamps upon said head to fasten it to the head of another connector, springs for forcing the clamps into fastening position and maintaining the clamps in such position, a centering member for the extendible head, and means of connection between the clamps and the centering member so that when the head is extended the clamps will be drawn back against the springs and vice versa.

This specification signed and witnessed this 19th day of June, A. D., 1908.

JOHN L. MOHUN.

Signed in the presence of—
 LUCIUS E. VARNEY,
 GRACE McGRANN.